(12) United States Patent
Teraue

(10) Patent No.: US 9,251,446 B2
(45) Date of Patent: Feb. 2, 2016

(54) COLOR REPRODUCTION ASSISTING SYSTEM, COLOR REPRODUCTION ASSISTING METHOD, AND NON-TRANSITORY STORAGE MEDIUM

(71) Applicant: FUJIFILM Corporation, Minato-ku, Tokyo (JP)

(72) Inventor: Eiji Teraue, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/473,035

(22) Filed: Aug. 29, 2014

(65) Prior Publication Data

US 2015/0070717 A1 Mar. 12, 2015

(30) Foreign Application Priority Data

Sep. 6, 2013 (JP) ................................. 2013-184868

(51) Int. Cl.
*H04N 1/40* (2006.01)
*G06K 15/02* (2006.01)
(Continued)

(52) U.S. Cl.
CPC .............. *G06K 15/1878* (2013.01); *H04N 1/54* (2013.01); *H04N 1/6058* (2013.01)

(58) Field of Classification Search
CPC ... H04N 1/6058; H04N 1/603; H04N 1/6052; H04N 1/60; H04N 1/6033; H04N 1/54; H04N 1/56; H04N 1/6019; H04N 1/6025; H04N 1/6055; H04N 1/6066; H04N 1/644; G06K 2215/0094
USPC ................... 358/1.9, 2.1, 504, 406, 500, 400, 358/519–523, 515–516, 527; 382/162–167
See application file for complete search history.

(56) References Cited

U.S. PATENT DOCUMENTS

| | | | | |
|---|---|---|---|---|
| 6,058,207 A | * | 5/2000 | Tuijn et al. | 382/162 |
| 6,633,302 B1 | * | 10/2003 | Ohsawa et al. | 345/604 |
| 2002/0136445 A1 | * | 9/2002 | Haikin et al. | 382/162 |

(Continued)

FOREIGN PATENT DOCUMENTS

| | | |
|---|---|---|
| JP | 2004236174 A | 8/2004 |
| JP | 2006157219 A | 6/2006 |

(Continued)

OTHER PUBLICATIONS

Communication, dated Oct. 15, 2014, issued in corresponding EP Application No. 14182274.2, 6 pages in English.
Rejection of the Application, dated Aug. 11, 2015, issued in corresponding JP Application No. 2013-184868, 8 pages in English and Japanese.

*Primary Examiner* — Thomas D Lee
*Assistant Examiner* — Stephen M Brinich
(74) *Attorney, Agent, or Firm* — Sugrue Mion, PLLC

(57) ABSTRACT

A plurality of printing conditions and designated color information are acquired, and it is judged whether a designated color specified from the designated color information can be reproduced under the printing conditions or not. On condition that at least one of the printing conditions under which the designated color cannot be reproduced is judged as being present, then a substitute color that is different from the designated color is determined in order to increase the number of the printing conditions under which the designated color can be reproduced. A display device displays visible information (colorimetric value display field, color difference display field, and color patch group) with respect to the substitute color.

5 Claims, 12 Drawing Sheets

(51) Int. Cl.
*H04N 1/54* (2006.01)
*H04N 1/60* (2006.01)

(56) References Cited

U.S. PATENT DOCUMENTS

| | | |
|---|---|---|
| 2005/0151983 A1* | 7/2005 | Harrington .................... 358/1.9 |
| 2006/0170940 A1* | 8/2006 | Kang et al. .................... 358/1.9 |
| 2009/0225340 A1 | 9/2009 | Hatori |
| 2010/0149563 A1 | 6/2010 | Otomaru |
| 2011/0058195 A1 | 3/2011 | Kano |
| 2011/0069077 A1 | 3/2011 | Chen et al. |
| 2011/0069332 A1 | 3/2011 | Katayama |

FOREIGN PATENT DOCUMENTS

| | | |
|---|---|---|
| JP | 2010137467 A | 6/2010 |
| JP | 2011061544 A | 3/2011 |
| JP | 2011-166731 A | 8/2011 |

* cited by examiner

COLOR REPRODUCTION ASSISTING SYSTEM, COLOR REPRODUCTION ASSISTING METHOD, AND NON-TRANSITORY STORAGE MEDIUM

CROSS-REFERENCE TO RELATED APPLICATION

This application is based upon and claims the benefit of priority from Japanese Patent Application No. 2013-184868 filed on Sep. 6, 2013, the contents of which are incorporated herein by reference.

BACKGROUND OF THE INVENTION

1. Field of the Invention

The present invention relates to a color reproduction assisting system, a color reproduction assisting method, and a non-transitory storage medium for assisting in the reproduction of designated colors on a print.

2. Description of the Related Art

Heretofore, there has been known in the printing field a technology for finely adjusting a color of an image into essential agreement with a color (hereinafter referred to as "designated color") designated by a color sample such as a color chip or the like. For faithfully reproducing a designated color, it is important to judge whether the designated color is present within the gamut of a printing press or not. Various processes have been proposed to predict whether a designated color can be reproduced or not and let the operator know the predicted result.

Japanese Laid-Open Patent Publication No. 2011-166731 discloses a process of displaying a list of the attributes and items of print mediums and the distances up to gamut boundaries. The operator can select the type of a print medium that is suitable for reproducing a designated color by confirming the details of the displayed list.

SUMMARY OF THE INVENTION

The present invention has been made with respect to the technical concept disclosed in Japanese Laid-Open Patent Publication No. 2011-166731. It is an object of the present invention to provide a color reproduction assisting system, a color reproduction assisting method, and a non-transitory storage medium which are capable of presenting the operator with information that is especially useful for reproducing a single designated color under a plurality of printing conditions.

According to the present invention, there is provided a color reproduction assisting system comprising a printing condition acquirer that acquires a plurality of printing conditions, a designated color information acquirer that acquires designated color information with respect to a single designated color, a reproducibility judging section that judges whether the designated color specified from the designated color information acquired by the designated color information acquirer can be reproduced under the printing conditions acquired by printing condition acquirer or not, a substitute color determiner that determines a substitute color that is different from the designated color in order to increase number of the printing conditions under which the designated color can be reproduced on condition that at least one of the printing conditions under which the designated color cannot be reproduced is judged as being present by the reproducibility judging section, and a display device that displays visible information with respect to the substitute color determined by the substitute color determiner.

Thus, on condition that at least one of the printing conditions under which the designated color cannot be reproduced is judged as being present, the reproducibility judging section is provided for determining a substitute color that is different from the designated color in order to increase the number of the printing conditions under which the designated color can be reproduced, and the display device is provided for displaying visible information with respect to the substitute color. Consequently, the color reproduction assisting system is capable of presenting particularly useful information to the operator thereof in reproducing the single designated color under the printing conditions. The color reproduction assisting system is capable of presenting particularly useful information in reproducing the single designated color under the printing conditions.

The substitute color determiner may preferably determine a color whose color difference from the designated color is minimum as the substitute color on condition that the number of the printing conditions under which the designated color can be reproduced remains the same.

The display device may preferably display a color patch of the designated color and a color patch of the substitute color, arranged in a juxtaposed array as the visible information.

The printing condition acquirer may further acquire degrees of importance allotted to the printing conditions, respectively, and the substitute color determiner may preferably determine the substitute color so that the designated color can be reproduced under all printing conditions whose degrees of importance are higher than other printing conditions.

According to the present invention, there is also provided a color reproduction assisting method comprising the steps, to be carried out by at least one computer, of acquiring a plurality of printing conditions, acquiring designated color information with respect to a single designated color, judging whether the designated color specified from the designated color information can be reproduced under the printing conditions that are acquired or not, determining a substitute color that is different from the designated color in order to increase number of the printing conditions under which the designated color can be reproduced on condition that at least one of the printing conditions under which the designated color cannot be reproduced is judged as being present, and displaying visible information on a display device with respect to the substitute color that is determined.

According to the present invention, there is further provided a non-transitory storage medium storing a program for enabling at least one computer to carry out the steps of acquiring a plurality of printing conditions, acquiring designated color information with respect to a single designated color, judging whether the designated color specified from the designated color information can be reproduced under the printing conditions that are acquired or not, determining a substitute color that is different from the designated color in order to increase number of the printing conditions under which the designated color can be reproduced on condition that at least one of the printing conditions under which the designated color cannot be reproduced is judged as being present, and displaying visible information on a display device with respect to the substitute color that is determined.

According to the present invention, there is further provided a program for enabling at least one computer to carry out the steps of acquiring a plurality of printing conditions, acquiring designated color information with respect to a single designated color, judging whether the designated color specified from the designated color information can be reproduced under the printing conditions that are acquired or not, determining a substitute color that is different from the designated color in order to increase the number of the printing conditions under which the designated color can be reproduced on condition that at least one of the printing conditions under which the designated color cannot be reproduced is judged as being present, and displaying visible information on a display device with respect to the substitute color that is determined.

With the color reproduction assisting system, the color reproduction assisting method, and the non-transitory storage medium described above, on condition that at least one of the printing conditions under which the designated color cannot be reproduced is judged as being present, a substitute color that is different from the designated color is determined in order to increase the number of the printing conditions under which the designated color can be reproduced, and visible information with respect to the substitute color is displayed. Consequently, particularly useful information can be presented to the operator thereof in reproducing the single designated color under the printing conditions.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A color reproduction assisting method according to a preferred embodiment of the present invention in relation to a color reproduction assisting system and a color reproduction assisting program for carrying out the color reproduction assisting method will be described in detail below with reference to the accompanying drawings.

[Overall Configuration of Print Production System 10]

Figure 1:
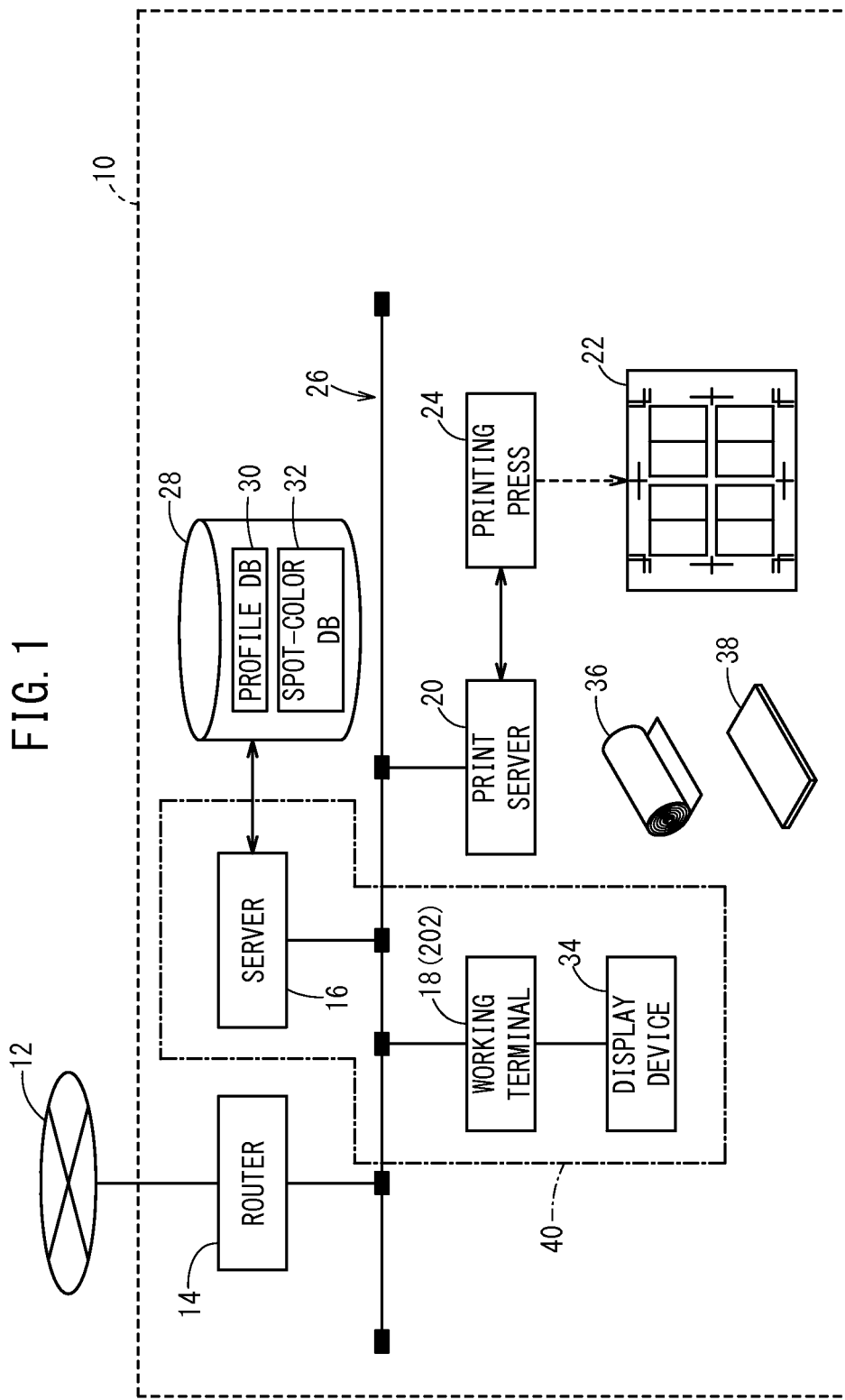
FIG. 1 is a block diagram showing an overall configuration of a print production system incorporating a color reproduction assisting system according to an embodiment of the present invention.

FIG. 1 shows in block form an overall configuration of a print production system 10 incorporating a color reproduction assisting system 40 according to an embodiment of the present invention.

As shown in FIG. 1, the print production system 10 includes a router 14 serving as a device for connection to a network 12, a server 16 which is accessible through the network 12 from terminal devices, not shown, belonging to external networks, a working terminal 18 for performing various information processing processes on contents data acquired from the server 16, etc., a print server 20 having a printing process function, and a printing press 24 for producing a print 22 based on output data sent from the print server 20.

The server 16 is an apparatus that plays a central role in the workflow management in the print production system 10. The server 16 is connected to the working terminal 18 and the print server 20 for communication therewith through a LAN (Local Area Network) 26 set up in the print production system 10. The server 16 may be connected to various terminal devices of designers or production companies, not shown, for communication therewith through the router 14 and the network 12.

A storage device 28 capable of storing various data about a workflow is connected to the server 16. The storage device 28 stores contents data, data to be output (hereinafter referred to as "output data"), e.g., platemaking data, printing plate data, or proof data, job ticket files {e.g., JDF (Job Definition Format) files}, color profiles, color sample data, etc. In FIG. 1, a database with respect to color profiles (hereinafter referred to as "profile DB 30") and a database with respect to spot color information (hereinafter referred to as "spot-color DB 32") are set up in the storage device 28.

The working terminal 18 is a device that performs a preflight process on contents data representing characters, figures, patterns, photographs, etc. and then generating data per page (page data) from the processed contents data. The working terminal 18 also performs an imposing process according to a binding process and a page folding process which have been designated, by referring to the tag information of a job ticket.

A display device 34 for displaying desired images for various working sequences is connected to the working terminal 18. The display device 34 may comprise a liquid crystal display panel, an organic EL (ElectroLuminescence) display panel, a cathode-ray tube (CRT), or a projector for projecting images onto a screen.

The print server 20 performs an RIP (Raster Image Processing) process on platemaking data, etc. that have been imposed, and supplies generated output data to the printing press 24.

Based on the output data supplied from the print server 20, the printing press 24 produces a print 22 that has images on a print medium 36. The print medium 36 may comprise a paper medium such as synthetic paper, thick paper, aluminum-evaporated paper, or the like, a resin medium such as vinyl chloride, PET (polyethylene terephthalate), or the like, or tarpaulin paper, metal sheet, or the like.

On condition that the printing press 24 comprises a proofer, then it may comprise a DDCP (Direct Digital Color Proofer), an ink jet color proofer, a low-resolution color laser printer (electrophotographic printer), an ink jet printer, or the like.

On condition that the printing press 24 comprises a letterpress printing press, then it produces a print 22 which has images printed on a print medium 36 by applying inks to the print medium 36 through printing plates 38 and intermediate transfer members, not shown.

On condition that the printing press 24 comprises a digital printing press, it can directly produce a print 22 without the need for generating printing plates 38. The digital printing press may comprise an ink jet printing press, a wide-format printing press, an ink jet color proofer, a color laser printer, or the like.

The server 16, the working terminal 18, and the display device 34 jointly make up the color reproduction assisting system 40 for reproducing a color (designated color to be described later) designated by a color sample such as a color chip or the like.

[Electric Block Form of Working Terminal 18]

Figure 2:
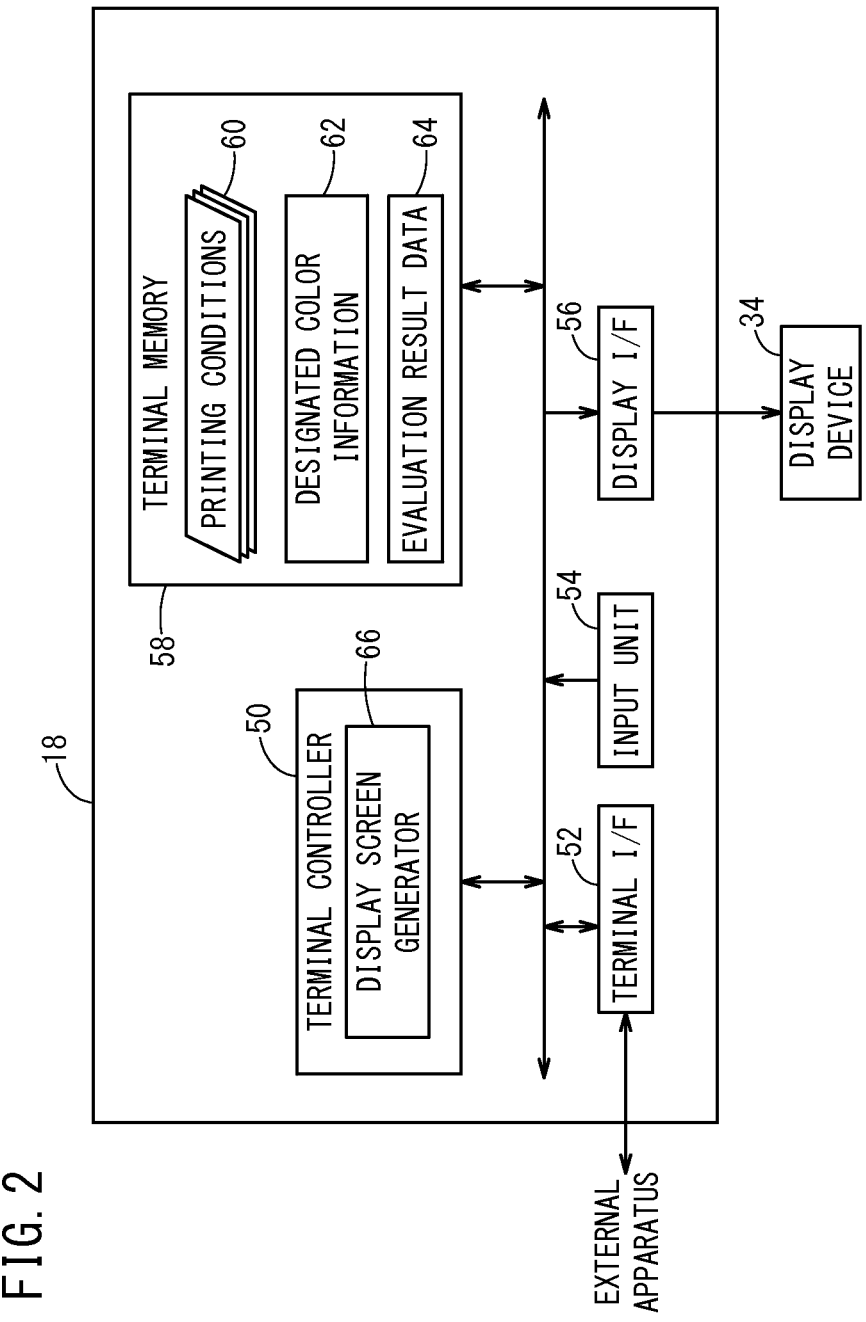
FIG. 2 is an electric block diagram of a working terminal shown in FIG. 1.

FIG. 2 shows in electric block form the working terminal 18 shown in FIG. 1. As shown in FIG. 2, the working terminal 18 basically comprises a computer having a terminal controller 50, a terminal I/F 52, an input unit 54, a display I/F 56, and a terminal memory 58 (storage medium).

The terminal I/F 52 is an interface for sending electric signals to and receiving electric signals from an external apparatus. The working terminal 18 can acquire various data, e.g., evaluation result data 64, from the server 16 (FIG. 1), and can supply various data, e.g., printing conditions 60, to the server 16.

Figure 10:
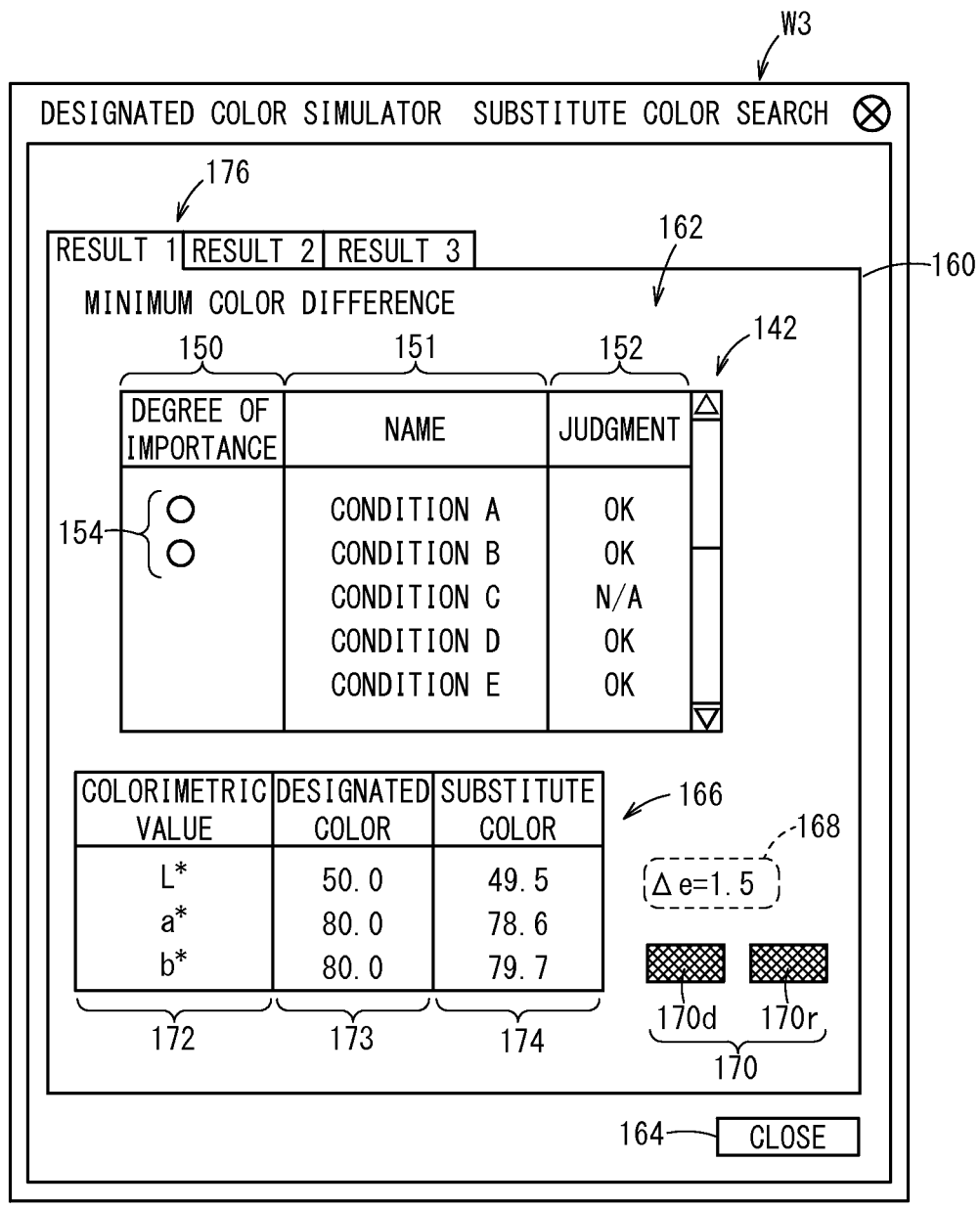
FIG. 10 is a view showing a first image representing a search result screen that shows substitute colors that have been found.

The input unit 54 comprises various input devices including a mouse, a track ball, a keyboard, a touch sensor, etc. The display I/F 56 is an interface for supplying display control signals to the display device 34. In a case where the display device 34 is supplied with display control signals, the display device 34 displays various images including a window W1 (FIG. 5), a window W2 (FIG. 7A or the like), and a window W3 (FIG. 10 or the like).

The terminal memory 58 stores programs and data required for the terminal controller 50 to control various components of the working terminal 18. In FIG. 2, the terminal memory 58 stores a plurality of printing conditions 60, designated color information 62, and evaluation result data 64.

The terminal controller 50 comprises an information processing unit, i.e., a processor, such as a CPU (Central Processing Unit) or the like. The terminal controller 50 reads out and executes programs stored in the terminal memory 58 thereby to carry out functions including a display screen generator 66.

[Electric Setup of Server 16]

Figure 3:
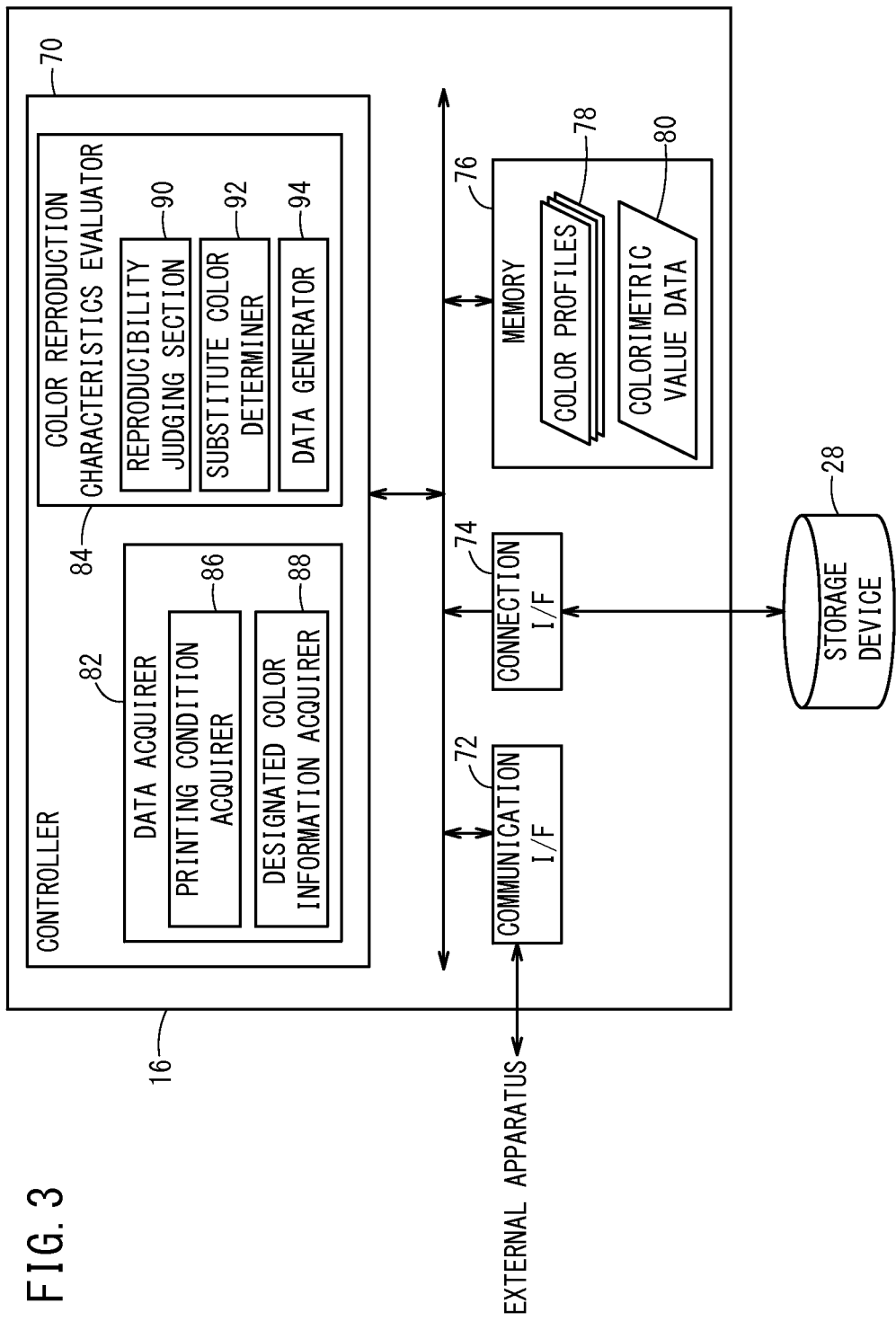
FIG. 3 is an electric block diagram of a server shown in FIG. 1.

FIG. 3 shows in electric block form the server 16 shown in FIG. 1. As shown in FIG. 3, the server 16 basically comprises a computer having a controller 70, a communication I/F 72, a connection I/F 74, and a memory 76 (storage medium).

The communication I/F 72 is an interface for sending electric signals to and receiving electric signals from an external apparatus. The server 16 can acquire various data, e.g., printing conditions 60, from the working terminal 18 (FIG. 1), and can supply various data, e.g., evaluation result data 64, to the working terminal 18.

The connection I/F 74 is an interface for sending data files to and receiving data files from the storage device 28. In response to a request from the server 16, the storage device 28 can supply a color profile 78 related to printing conditions 60, for example, to the server 16 through the connection I/F 74.

The memory 76 stores programs and data required for the controller 70 to control various components of the server 16. In FIG. 3, the memory 76 stores a plurality of color profiles 78 and colorimetric value data 80.

The memory 76 may comprise a non-transitory computer-readable storage medium. The computer-readable storage medium comprises a portable medium such as a magnetooptic disk, a ROM, a CD-ROM, a flash memory, or the like, or a storage medium such as a hard disk or the like incorporated in a computer system. The storage medium also includes a medium for dynamically holding programs for a short period of time, or a medium for holding programs for a certain period of time.

The controller 70 comprises an information processing unit such as a CPU or the like. The controller 70 reads out and executes programs stored in the memory 76 thereby to carry out functions including a data acquirer 82 and a color reproduction characteristics evaluator 84.

The data acquirer 82 acquires various data for use in an evaluating process carried out by the color reproduction characteristics evaluator 84. Specifically, the data acquirer 82 includes a printing condition acquirer 86 for acquiring a plurality of printing conditions 60 (FIG. 2) and a designated color information acquirer 88 for acquiring designated color information 62.

The "printing conditions" referred to above refer to composite conditions representing a combination of at least one condition item about printing. Condition items include a condition name (including the name of a data file), the type and name of the printing press 24, the type and size of the print medium 36, a plate size, color plates, a binding process, the type and customer name of a color profile 78, and the type of a job. The condition items may include not only data directly involved in a printing process, but also data (so-called metadata) ancillary to those data. For offset printing, condition items include, for example, the printing press 24, the print medium 36, the printing plates 38, inks, a halftone dot type, a resolution, a screen ruling, an angle set, and color converting conditions including a dot gain curve, a color profile 78, etc.

The "designated color information" referred to above is information with respect to a color (hereinafter referred to as "designated color") designated by a color sample such as a color chip or the like. The designated color information includes not only a color sample itself, but also colorimetric values or type thereof. Colorimetric values represent, for example, tristimulus values X, Y, Z, device-independent data including values L*, a*, b* of a uniform color space, and device-dependent data including values R, G, B and values C, M, Y, K. The type of a color sample includes a manufacturer name, a color sample number, etc.

The color reproduction characteristics evaluator 84 carries out an evaluating process with respect to the reproducibility of a designated color. Specifically, the color reproduction characteristics evaluator 84 includes a reproducibility judging section 90 for judging whether a designated color can be reproduced under each printing condition 60, a substitute color determiner 92 for determining a substitute color that is different from a designated color under predetermined conditions, and a data generator 94 for generating evaluation result data 64 based on the result of the evaluating process.

[Operation of Color Reproduction Assisting System 40]

The color reproduction assisting system 40 according to the present embodiment is configured as described above. Operation of the working terminal 18 shown in FIG. 2 and the server 16 shown in FIG. 3 will be described in detail below with reference to a flowchart shown in FIG. 4.

Figure 4:
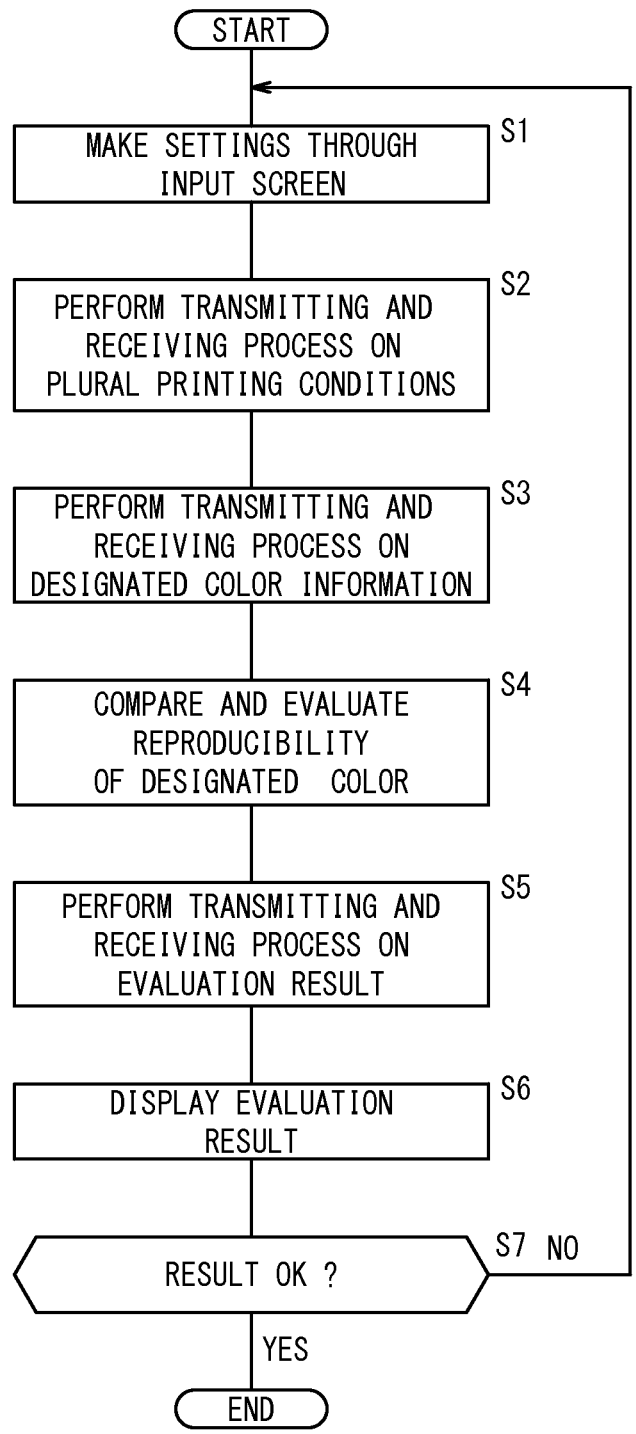
FIG. 4 is a flowchart of an operation sequence of the working terminal shown in FIG. 2 and the server shown in FIG. 3.
Figure 5:
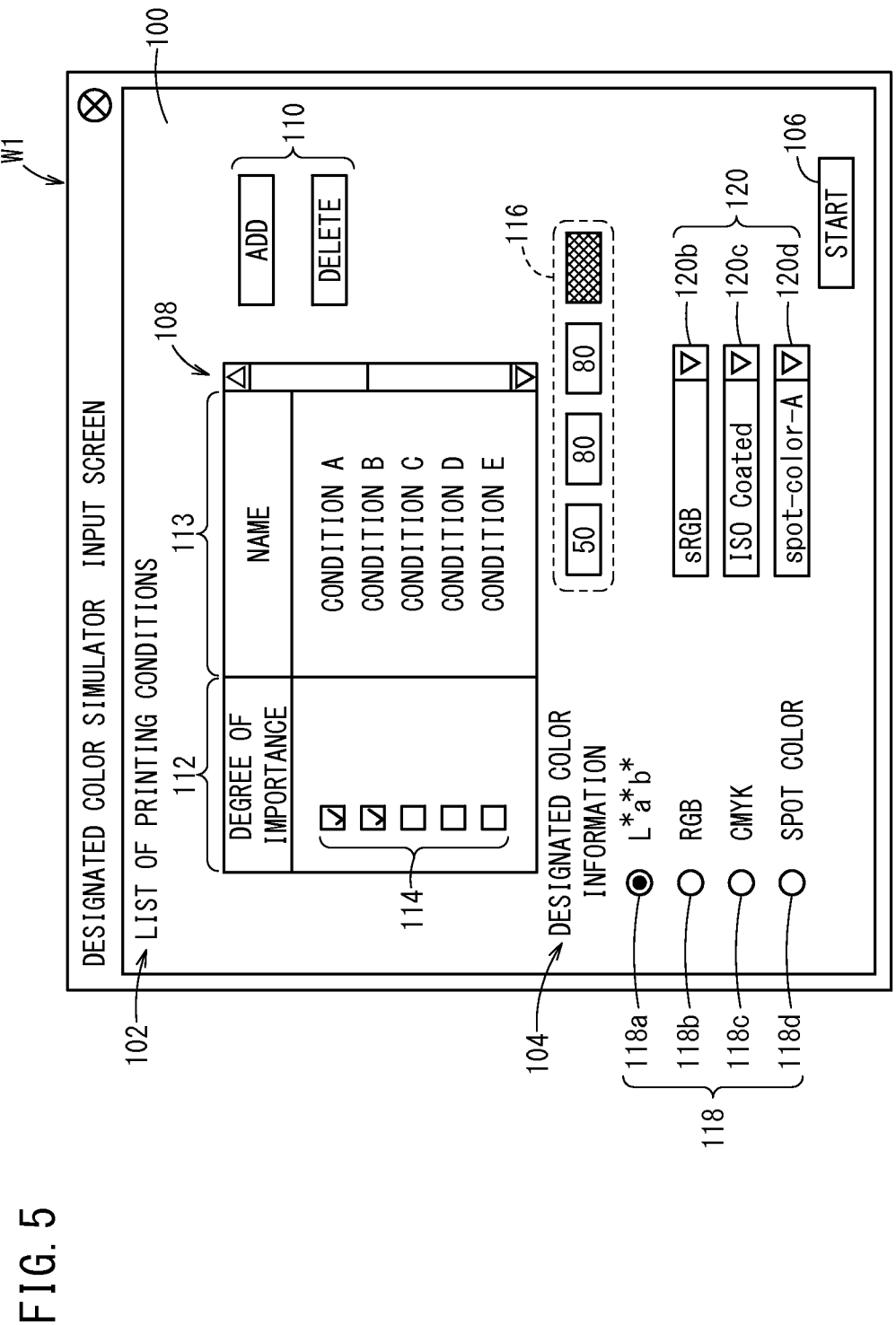
FIG. 5 is a view showing an image representing an input screen for entering printing conditions and designated color information.

In step S1 shown in FIG. 4, the working terminal 18 makes various settings through an input screen 100 (see FIG. 5). In response to an instruction for starting to make settings, the display screen generator 66 generates display data for the input screen 100, and then supplies the generated display data to the display I/F 56. The display device 34 displays a window W1 including the input screen 100 based on the display data from the display I/F 56.

As shown in FIG. 5, the input screen 100 includes a first setting field 102, a second setting field 104, and a button 106 labeled "START". The operator of the working terminal 18 can operate the input unit 54 (FIG. 2) to make various settings in the first setting field 102 or the second setting field 104.

The first setting field 102 includes a list 108 (hereinafter referred to as "condition list 108") of printing conditions 60 to be evaluated and a button group 110 having buttons labeled "ADD" and "DELETE". The condition list 108 includes a subfield 112 showing degrees of importance on a left side and a subfield 113 showing names on a right side.

The subfield 113 shows the name of at least one printing condition 60. In FIG. 5, the subfield 112 enumerates "CONDITION A", "CONDITION B", "CONDITION C", "CONDITION D", and "CONDITION E". The subfield 112 shows an array of checkboxes 114 associated with respective printing conditions 60 listed in the subfield 113. The operator may operate the button group 110 to add a new printing condition 60 to the subfield 113 and to delete a printing condition 60 from the subfield 113.

The second setting field 104 includes a text box group 116, a radio button group 118, and a pull-down menu group 120.

The text box group 116 has text boxes for setting colorimetric values of a designated color. The radio button group 118 has radio buttons 118a, 118b, 118c, 118d for indicating values L*, a*, b*, values R, G, B, values C, M, Y, K, and spot-color values, respectively. The pull-down menu group 120 has pull-down menus 120b, 120c, 120d for setting names of color profiles 78. In a case where the operator selects the radio button 118a of the radio button group 118, the operator can enter values L*, a*, b* of a CIELAB color system as representing a designated color, using the text boxes of the text box group 116.

In a case where the operator selects the radio button 118b of the radio button group 118, the operator can enter values R, G, B of a device-depending color space as representing a designated color, using the text boxes of the text box group 116. At this time, the operator also sets the name of a color profile 78, i.e., "sRGB", registered in the profile DB 30 (FIG. 1) using the pull-down menu 120b.

In a case where the operator selects the radio button 118c of the radio button group 118, the operator can enter values C, M, Y, K of a device-depending color space as representing a designated color, using the text boxes of the text box group 116. At this time, the operator also sets the name of a color profile 78, i.e., "ISO Coated", registered in the profile DB 30 using the pull-down menu 120c.

In a case where the operator selects the radio button 118d of the radio button group 118, the operator can enter values of a spot color as representing a designated color, using the text boxes of the text box group 116. At this time, the operator also sets the name of the spot color, i.e., "spot-color-A", registered in the spot-color DB 32 (FIG. 1) using the pull-down menu 120d.

The terminal controller 50 judges whether the operator has clicked on the "START" button 106 using the input unit 54 or not. On condition that the terminal controller 50 judges that the operator has clicked on the "START" button 106, then control goes to step S2.

In step S2, the color reproduction assisting system 40 performs a transmitting and receiving process on a plurality of printing conditions 60. Prior to the transmitting and receiving process, the terminal controller 50 temporarily stores a plurality of printing conditions 60 in the terminal memory 58.

The working terminal 18 transmits communication data including the printing conditions 60 to the server 16 through the terminal I/F 52. The server 16 receives the communication data transmitted through the LAN 26 and the communication I/F 72.

Thereafter, the controller 70 (printing condition acquirer 86) acquires the printing conditions 60 included in the communication data. In FIG. 5, five conditions, i.e., "CONDITION A", "CONDITION B", "CONDITION C", "CONDITION D", and "CONDITION E", are acquired as the printing conditions 60. Since the checkboxes 114 corresponding to "CONDITION A" and "CONDITION B" are ticked in FIG. 5, higher degrees of importance are given to these printing conditions 60.

In step S3, the color reproduction assisting system 40 performs a transmitting and receiving process on designated color information 62. Prior to the transmitting and receiving process, the terminal controller 50 temporarily stores designated color information 62 in the terminal memory 58. The working terminal 18 transmits communication data including the designated color information 62 to the server 16 through the terminal I/F 52. The server 16 receives the communication data transmitted through the LAN 26 and the communication I/F 72.

Thereafter, the controller 70 (designated color information acquirer 88) acquires the designated color information 62 included in the communication data. In FIG. 5, colorimetric values (L*, a*, b*=50, 80, 80) are acquired as the designated color information 62. The designated color information 62 may be acquired not only by a manual process using the input screen 100, but also automatically as color sample information contained in a job ticket, for example.

In step S4, the color reproduction characteristics evaluator 84 compares and evaluates the reproducibility of the designated color under the printing conditions 60. Before the reproducibility of the designated color is evaluated, the controller 70 refers to the profile DB 30 set up in the storage device 28, and reads out color profiles 78 related to the respective printing conditions 60. As necessary, the controller 70 refers to the profile DB 30 or the spot-color DB 32 set up in the storage device 28, and acquires colorimetric value data 80, i.e., values L*, a*, b*, related to the designated color information 62.

The reproducibility judging section 90 judges whether the single designated color can be reproduced under the printing conditions 60 or not. Prior to the judgment, the reproducibility judging section 90 defines the ranges of gamuts Ga through Ge under the printing conditions 60 using color conversion tables which the color profiles 78 have.

Figure 6:
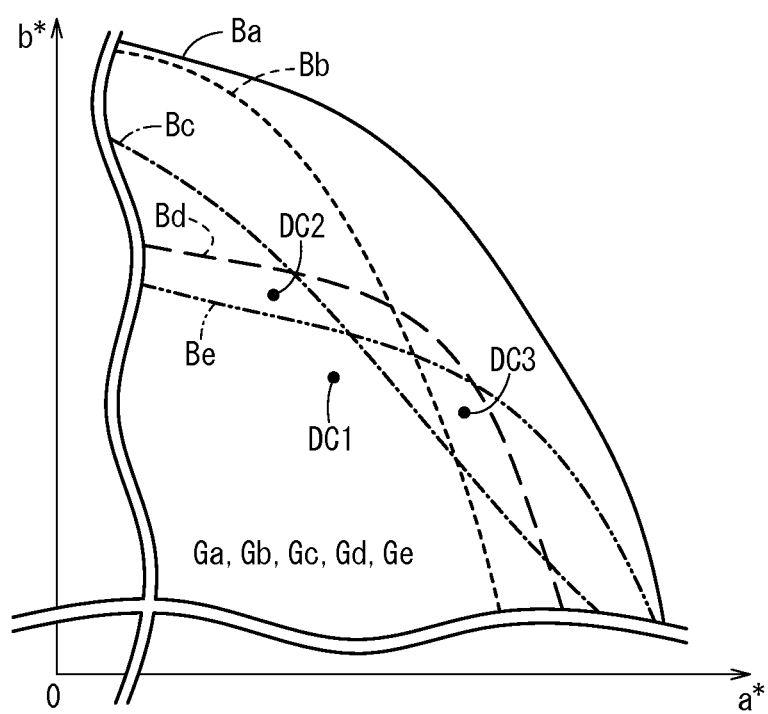
FIG. 6 is a graph showing the relationship between gamuts and a designated color under the printing conditions.

FIG. 6 is a graph showing the relationship between the gamuts Ga through Ge and a designated color under the printing conditions 60. FIG. 6 illustrates cross sections of the gamuts Ga through Ge taken along a plane (L*=50) with an L*-axis extending normal thereto. The graph shown in FIG. 6 has a horizontal axis representing a* and a vertical axis representing b*. For illustrative purposes, the ranges of the gamuts Ga through Ge are partly omitted from illustration, and are shown as exaggerated in size.

The solid-line curve represents a portion of a boundary Ba of the gamut Ga under "CONDITION A". The shorter-dot-line curve represents a portion of a boundary Bb of the gamut Gb under "CONDITION B". The dot-and-dash-line curve represents a portion of a boundary Bc of the gamut Gc under "CONDITION C". The longer-dot-line curve represents a portion of a boundary Bd of the gamut Gd under "CONDI- TION D". The two-dot-and-dash-line curve represents a portion of a boundary Be of the gamut Ge under "CONDITION E".

The reproducibility judging section 90 judges whether the designated color can be reproduced or not by referring to the positional relationship between the gamuts Ga through Ge and a single colorimetric value, e.g., DC1. The three dots shown in FIG. 6 correspond to colorimetric values DC1, DC2, DC3, respectively of the designated color. Though only one designated color is selected in reality, the colorimetric values DC1, DC2, DC3 thereof are simultaneously shown for illustrative purposes.

Thereafter, the data generator 94 generates evaluation result data 64 from the judgment result produced by the reproducibility judging section 90. The evaluation result data 64 indicate that on condition the designated color has the colorimetric value DC1, then it can be reproduced under "CONDITION A", "CONDITION B", "CONDITION C", "CONDITION D", and "CONDITION E".

In step S5, the color reproduction assisting system 40 performs a transmitting and receiving process on the evaluation result data 64. Prior to the transmitting and receiving process, the server 16 temporarily stores the evaluation result data 64 in the memory 76. The server 16 then transmits communication data including the evaluation result data 64 through the communication I/F 72 to the working terminal 18. The working terminal 18 receives the communication data through the LAN 26 and the terminal I/F 52. Thereafter, the terminal controller 50 temporarily stores the evaluation result data 64 included in the communication data in the terminal memory 58.

In step S6, the working terminal 18 displays an evaluation result (particularly, a judgment result) represented by the evaluation result data 64 acquired in step S5 on the display device 34. Specifically, the display screen generator 66 generates display data for an evaluation result screen 140 (see FIG. 7A), and then supplies the generated display data through the display I/F 56 to the display device 34, which displays a new window W2 including the evaluation result screen 140.

Figure 7A:
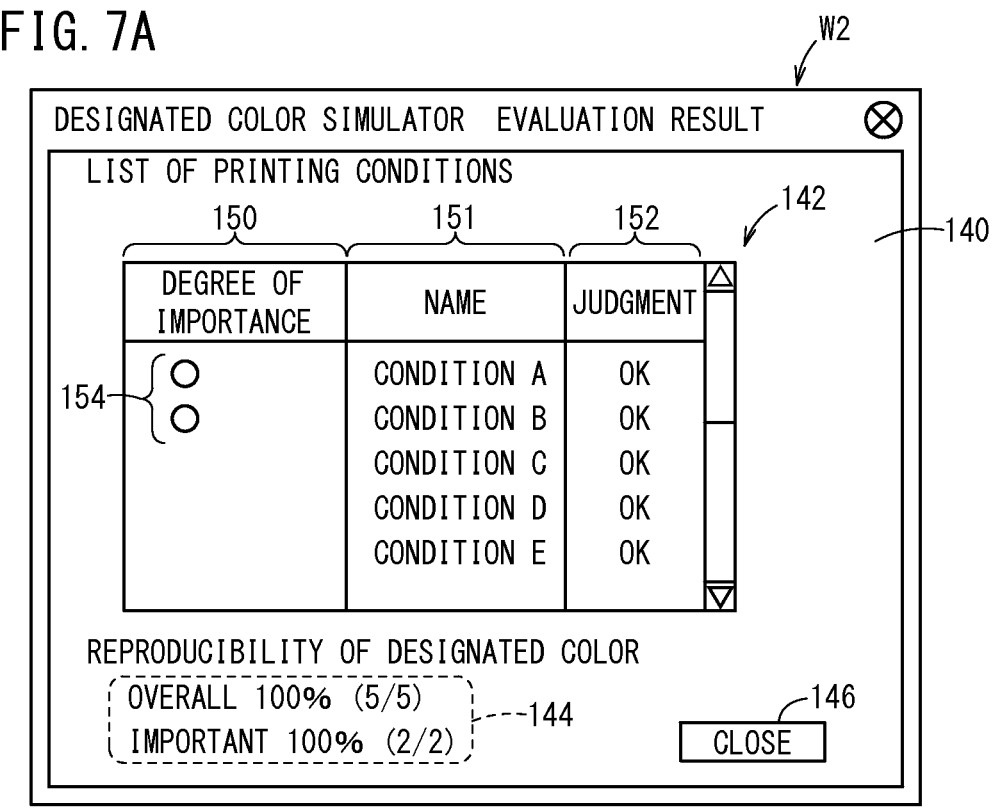
FIG. 7A is a view showing a first image representing an evaluation result screen that shows evaluated color reproduction characteristics.

As shown in FIG. 7A, the evaluation result screen 140 includes a list 142 (hereinafter referred to as "result list 142") of evaluation results under the respective printing conditions 60, a reproduction ratio indicating field 144 for quantitatively indicating the reproduction ratio of a designated color, and a button 146 labeled "CLOSE". The result list 142 includes a subfield 150 showing allotted degrees of importance on a left side, a subfield 151 showing condition names, and a subfield 152 showing judgment results.

The subfield 151 shows the same details as those shown in the subfield 113 (FIG. 5), i.e., the enumerated names of the five printing conditions 60 illustrated in FIG. 5. The subfield 150 shows circles 154 in locations associated respectively with "CONDITION A" and "CONDITION B". The circles 154 correspond respectively to the printing conditions 60 whose checkboxes 114 (FIG. 5) are ticked.

The subfield 152 shows judgment results about whether the designated color can be reproduced under the printing conditions 60 or not. On condition that the designated color has the colorimetric value DC1 (see FIG. 6), then the designated color belongs to every one of the gamuts Ga through Ge. In this case, the subfield 152 shows "OK", indicating that the designated color can be reproduced, in locations associated respectively with "CONDITION A", "CONDITION B", "CONDITION C", "CONDITION D", and "CONDITION E".

The reproduction ratio indicating field 144 shows "OVERALL 100% (5/5)" in its upper tier, which indicates a reproduction ratio about all the printing conditions 60 (five printing conditions in FIG. 7A) to be evaluated. The reproduction ratio indicating field 144 shows "IMPORTANT 100% (2/2)" in its lower tier, which indicates a reproduction ratio about those printing conditions 60 to be evaluated whose degrees of importance are higher (two printing conditions 60, i.e., "CONDITION A" and "CONDITION B").

On the condition that the designated color has the colorimetric value DC2 (see FIG. 6), then the designated color belongs to the four gamuts Ga through Gd, but does not belong to the gamut Ge. At this time, the display device 34 displays a window W2 including an evaluation result screen 140 shown in FIG. 7B, rather than the evaluation result screen 140 shown in FIG. 7A.

Figure 7B:
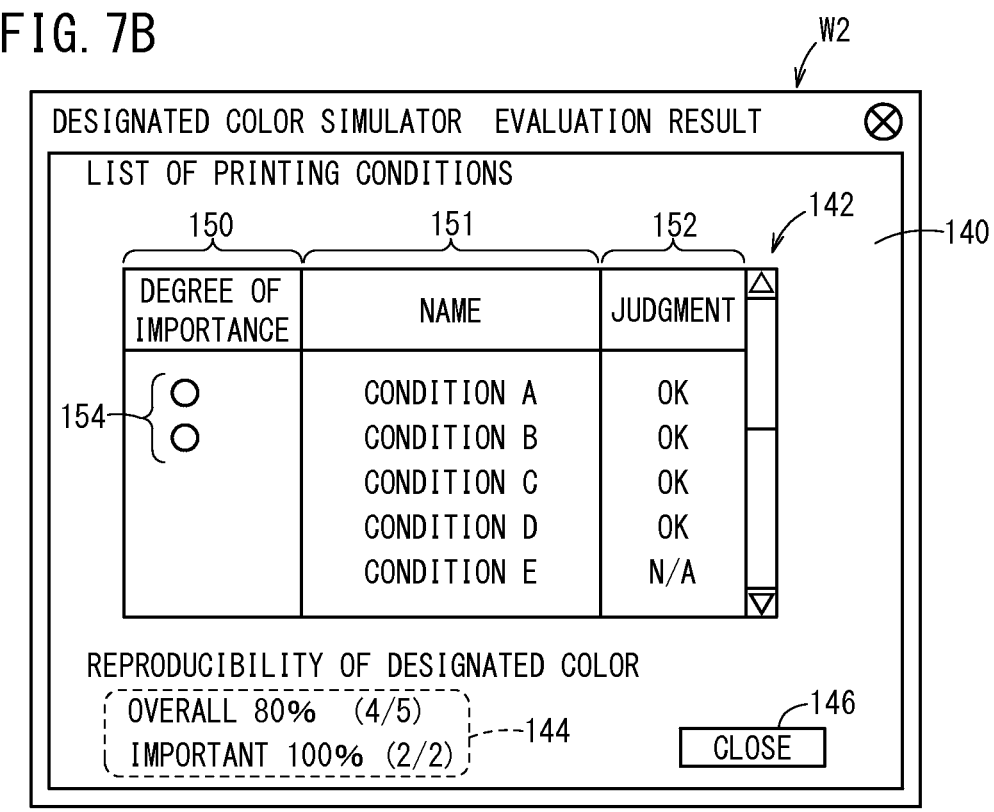
FIG. 7B is a view showing a second image representing an evaluation result screen.

The evaluation result screen 140 shown in FIG. 7B includes a result list 142 having subfields 150, 151, 152, a reproduction ratio indicating field 144, and a button 146, which are identical to those shown in FIG. 7A. In the evaluation result screen 140 shown in FIG. 7B, the subfield 152 shows "OK", indicating that the designated color can be reproduced, in locations associated respectively with "CONDITION A", "CONDITION B", "CONDITION C", and "CONDITION D", and shows "N/A", indicating that the designated color cannot be reproduced, in a location associated with "CONDITION E", and the reproduction ratio indicating field 144 shows "OVERALL 80% (4/5)" in its upper tier although it shows "IMPORTANT 100% (2/2)" in its lower tier.

In step S7 shown in FIG. 4, the operator confirms the details shown in the evaluation result screens 140 shown in FIGS. 7A and 7B, and judges whether the printing conditions 60 and the designated color information 62 should be finalized as they are or not.

On condition that the operator judges that the printing conditions 60 and the designated color information 62 should not be finalized (S7: NO), then control goes back to step S1 and repeats steps S1 through S7, i.e., the operator makes settings in the first setting field 102 and the second setting field 104 and the reproducibility of the designated color is evaluated, thereby selecting optimum printing conditions 60 and designated color information 62.

On condition that the operator judges that the printing conditions 60 and the designated color information 62 should be finalized (S7: YES), then the operation of the color reproduction assisting system 40 comes to an end. The printing press 24 produces a print 22 that has images on a print medium 36, based on the output data supplied from the print server 20. As a result, the designated color is faithfully reproduced in a certain area on the print 22.

[Function to Search for Substitute Color]

The color reproduction assisting system 40 can perform a function to search for a substitute color. The function to search for a substitute color will be described below. The "substitute color" refers to a color as a substitute for a designated color, and represents a color in the vicinity of a designated color.

On condition that the designated color has the colorimetric value DC3 (see FIG. 6), then the designated color belongs to the three gamuts Ga, Gd, Ge, but does not belong to the two gamuts Gb, Gc. At this time, the display device 34 displays a window W2 including an evaluation result screen 140 shown in FIG. 8, rather than the evaluation result screen 140 shown in FIG. 7A.

Figure 8:
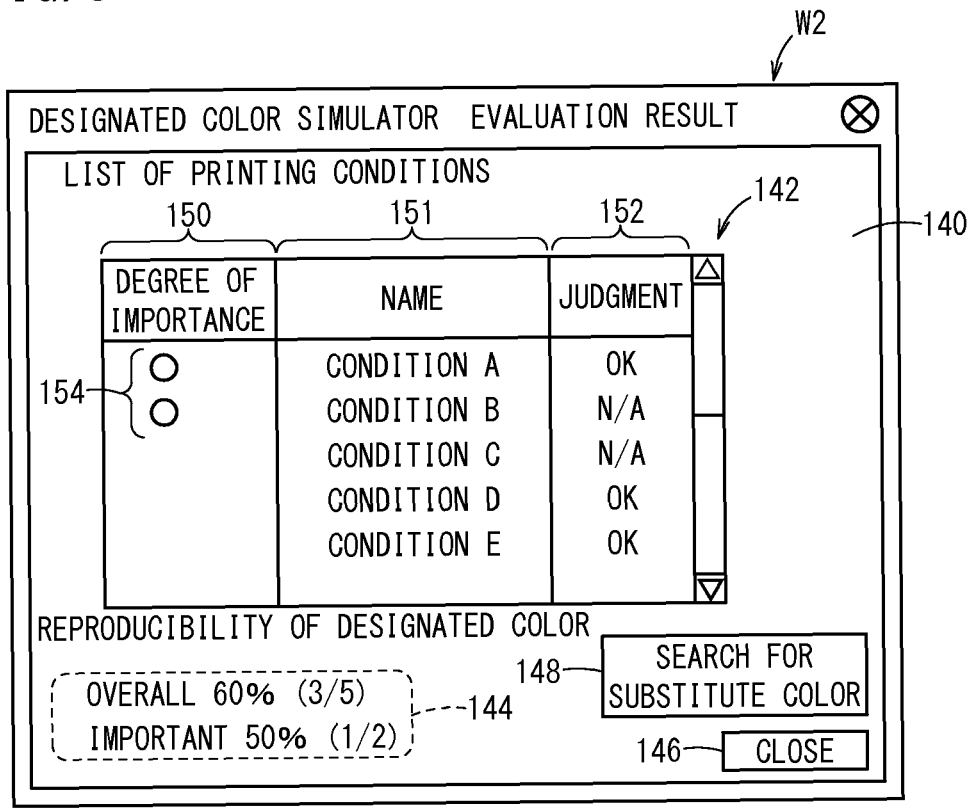
FIG. 8 is a view showing a third image representing an evaluation result screen.

The evaluation result screen 140 shown in FIG. 8 includes a result list 142 having subfields 150, 151, 152, a reproduction ratio indicating field 144, and a button 146, which are identical to those shown in FIG. 7A. In the evaluation result screen 140 shown in FIG. 8, the subfield 152 shows "OK", indicating that the designated color can be reproduced, in locations associated respectively with "CONDITION A", "CONDITION D", and "CONDITION E", and shows "N/A", indicating that the designated color cannot be reproduced, in locations associated respectively with "CONDITION B" and "CONDITION C", and the reproduction ratio indicating field 144 shows "OVERALL 60% (3/5)" in its upper tier and shows "IMPORTANT 50% (1/2)" in its lower tier.

The evaluation result screen 140 also includes a button 148 labeled "SEARCH FOR SUBSTITUTE COLOR" directly above the "CLOSE" button 146. The "SEARCH FOR SUBSTITUTE COLOR" button 148 doubles as an indicator for letting the operator know that there are "CONDITION B" and "CONDITION C" under which the designated color cannot be reproduced, among the printing conditions 60.

In a case where the operator clicks on the "SEARCH FOR SUBSTITUTE COLOR" button 148, the color reproduction characteristics evaluator 84 further carries out an evaluating process with respect to the reproducibility of a designated color. The details of the operation sequence up to the evaluating process are basically identical to steps S1 through S4 (FIG. 4), and will not be described below.

Figure 9A:
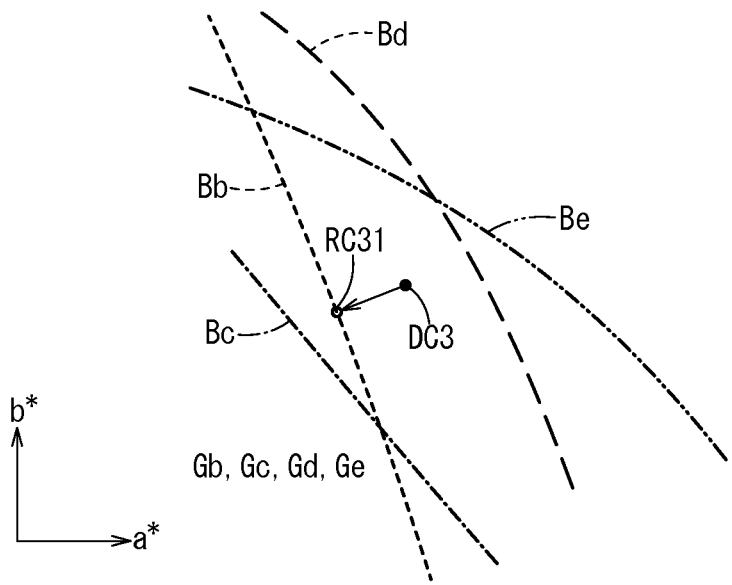
FIGS. 9A and 9B are diagrams illustrating a process of searching for a substitute color.
Figure 9B:
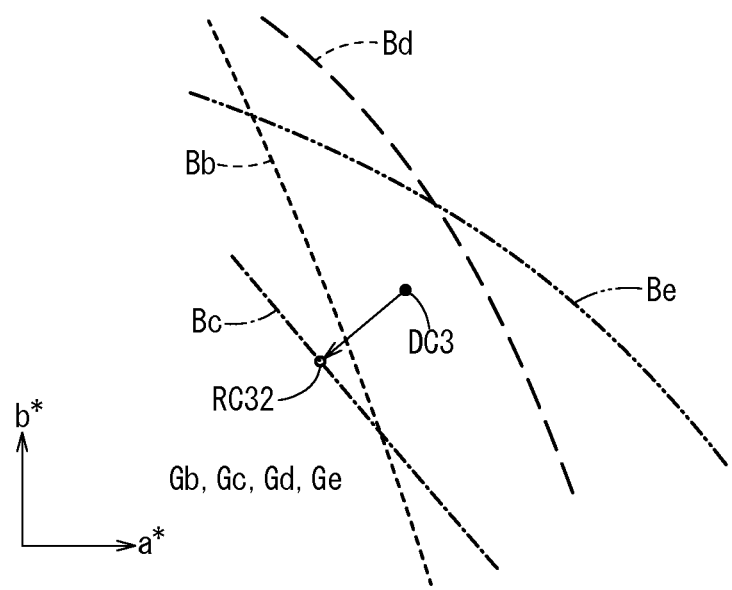

The substitute color determiner 92 determines, under a certain condition, a substitute color in order to increase the number of printing conditions 60 under which the designated color can be reproduced. The "certain condition" refers to a situation in which there is at least one of the printing conditions 60 under which the designated color cannot be reproduced. A process of searching for a substitute color will be described below with reference to FIGS. 9A and 9B. FIGS. 9A and 9B show at an enlarged scale a graph that corresponds to an area around the colorimetric value DC3 shown in FIG. 6.

FIG. 9A illustrates an example wherein the number of printing conditions 60 under which the designated color can be reproduced is incremented by 1. On condition that the number (4 in FIG. 9A) of printing conditions 60 under which the designated color can be reproduced remains the same, then the substitute color determiner 92 determines a color whose color difference from the designated color is minimum as a substitute color. As a result, the substitute color determiner 92 determines a colorimetric value RC31 that is present on the boundary Bb and spaced from the colorimetric value DC3 by a minimum distance, as a substitute color.

In the example shown in FIG. 9A, the substitute color determiner 92 can be said to have determined a substitute color so that the designated color can be reproduced under all the printing conditions 60 whose degrees of importance are higher, i.e., "CONDITION A" and "CONDITION B".

FIG. 9B illustrates an example wherein the number of printing conditions 60 under which the designated color can be reproduced is incremented by 2. The substitute color determiner 92 determines a color which can be reproduced under all the printing conditions 60 and whose color difference from the designated color is minimum, as a substitute color. As a result, the substitute color determiner 92 determines a colorimetric value RC32 that is present on the boundary Bc and spaced from the colorimetric value DC3 by a minimum distance, as a substitute color.

In step S6, the working terminal 18 displays an evaluation result (particularly, a search result) acquired in step S5 on the display device 34. Specifically, the display screen generator 66 generates display data for a search result screen 160, and then supplies the generated display data through the display I/F 56 to the display device 34, which displays a new window W3 including the search result screen 160.

The search result screen 160 shown in FIG. 10 includes a search display field 162 for showing a search result about the designated color and a button 164 labeled "CLOSE". The search display field 162 includes a result list 142 having subfields 150, 151, 152, which are similar to those shown in FIG. 7A or the like. The search display field 162 also includes a colorimetric value display field 166 for showing colorimetric values of designated colors and substitute colors, a color difference display field 168 for showing a color difference, and a color patch group 170.

The colorimetric value display field 166 includes a subfield 172 showing types of colorimetric values on a left side, a subfield 173 showing colorimetric values DC3 (FIG. 6) of designated colors in the middle, and a subfield 174 showing colorimetric values RC31 (FIG. 9A) of substitute colors on a right side.

The color difference display field 168 shows the color difference $\Delta e$ between a colorimetric value DC3 and a colorimetric value RC31. The color patch group 170 includes a color patch 170d of a designated color, i.e., a color representing a colorimetric value DC3, and a color patch 170r of a substitute color, i.e., a color representing a colorimetric value RC31, the color patches 170d, 170r being arranged in a juxtaposed array. The visible information thus displayed by the color difference display field 168 allows the operator to grasp the relationship between a designated color and a substitute color at a glance.

Figure 11:
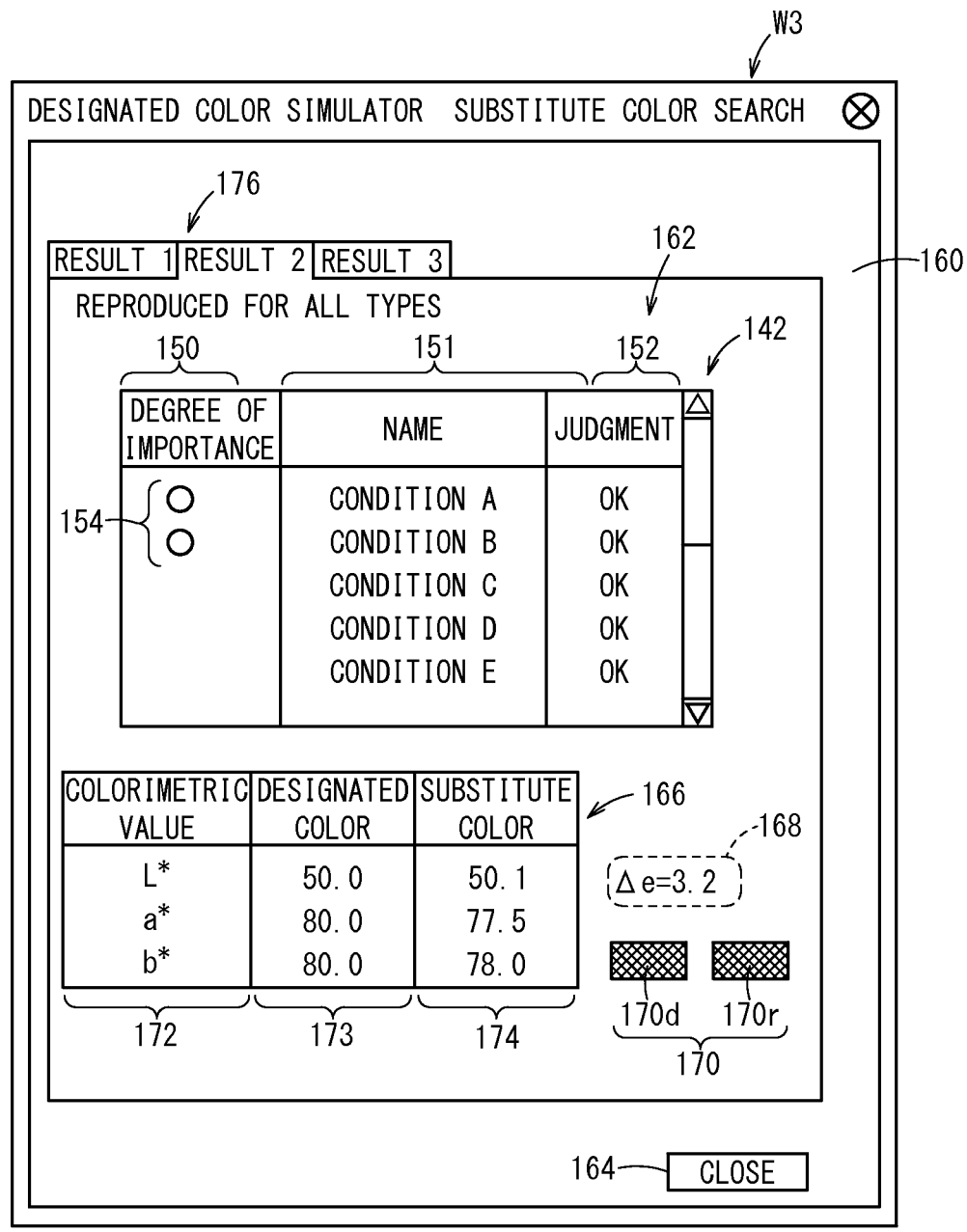
FIG. 11 is a view showing a second image representing a search result screen that shows substitute colors that have been found.

In a case where the operator clicks on another tab 176 of the search display field 162, the search result screen 160 shown in FIG. 10 switches to a search result screen 160 shown in FIG. 11, changing details of the search display field 162. A comparison between FIGS. 10 and 11 indicates that details displayed in the subfields 152, 174 and the color difference display fields 168 are different from each other. The displayed color of the color patch 170r is also slightly changed in a case where the search result screen 160 shown in FIG. 10 switches to the search result screen 160 shown in FIG. 11.

Since a plurality of substitute colors (colorimetric values RC31, RC32) obtained according to difference color searching processes are presented at a time, the operator is given a wider choice of alternatives and may find it more convenient. Various known algorithms are available for the color searching processes. For example, the target (evaluation index) of a minimization algorithm may be not only color difference, but also lightness and saturation.

[Advantages of Color Reproduction Assisting System 40]

The color reproduction assisting system 40 includes the printing condition acquirer 86 that acquires a plurality of printing conditions 60, the designated color information acquirer 88 that acquires designated color information 62 with respect to a single designated color, the reproducibility judging section 90 that judges whether the designated color specified from the designated color information 62 can be reproduced under the printing conditions 60, the substitute color determiner 92 that determines a substitute color that is different from the designated color in order to increase the number of printing conditions 60 under which the designated color can be reproduced on condition that at least one of the printing conditions 60 under which the designated color cannot be reproduced is judged as being present, and the display device 34 that displays visible information (the colorimetric value display field 166, the color difference display field 168, and the color patch group 170) with respect to the substitute color. The color reproduction assisting system 40 thus configured is capable of presenting particularly useful information in reproducing the single designated color under the printing conditions 60.

[Modifications]

Configurational and operational details of a color reproduction assisting system 200 (see FIG. 12) according to a modification of the above embodiment will be described below.

Figure 12:
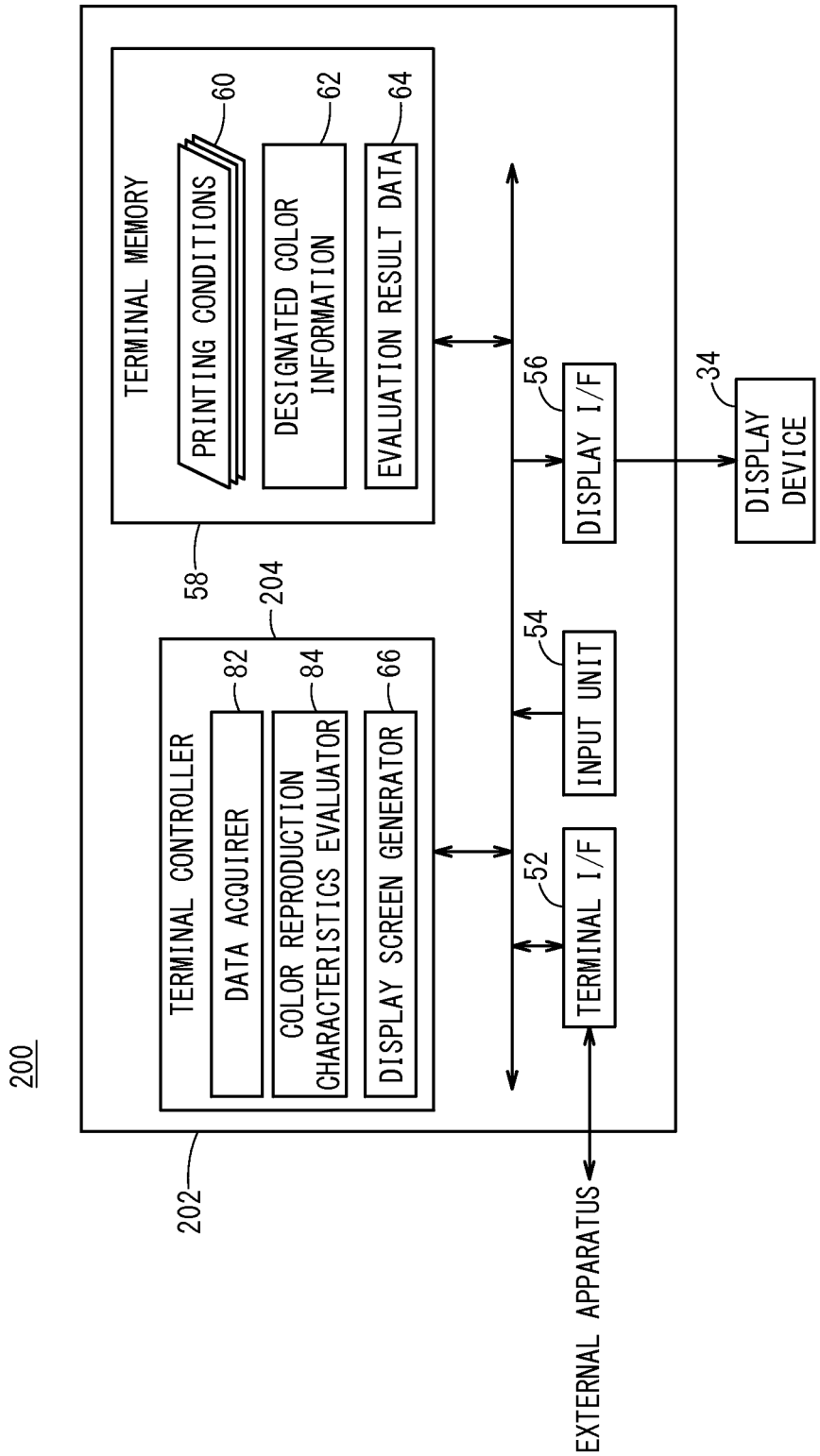
FIG. 12 is an electric block diagram of a color reproduction assisting system according to a modification.

As shown in FIG. 12, the color reproduction assisting system 200 has a working terminal 202 and a display device 34. The working terminal 202 includes a terminal controller 204 instead of the terminal controller 50 (FIG. 2), and is otherwise identical to the working terminal 18. The terminal controller 204 reads out and executes programs stored in the terminal memory 58 thereby to carry out functions including the display screen generator 66, the data acquirer 82, and the color reproduction characteristics evaluator 84.

In the color reproduction assisting system 200, the working terminal 202 operates to evaluate the reproducibility of a designated color. The color reproduction assisting system 200 thus configured offers the same advantages as those of the color reproduction assisting system 40 according to the above embodiment. In steps S2, S3 shown in FIG. 4, the working terminal 202 needs to send a transmission request to the server 16 for acquiring a plurality of color profiles 78 and colorimetric data 80. As the working terminal 202 itself evaluates the reproducibility of a designated color, the transmitting and receiving process about the evaluation result in step S5 shown in FIG. 4 is not necessary.

Although the preferred embodiments of the present invention have been described in detail above, the present invention is not limited to the embodiments, but various many changes and modifications may be made to the embodiments without departing from the scope of the appended claims.

What is claimed is:

1. A color reproduction assisting system comprising:
   a printing condition acquirer that acquires a plurality of printing conditions;
   a designated color information acquirer that acquires designated color information with respect to a single designated color;
   a reproducibility judging section that judges whether the designated color specified from the designated color information acquired by the designated color information acquirer can be reproduced under the printing conditions acquired by printing condition acquirer or not;
   a substitute color determiner that determines a substitute color that is different from the designated color in order to increase number of the printing conditions under which the designated color can be reproduced on condition that at least one of the printing conditions under which the designated color cannot be reproduced is judged as being present by the reproducibility judging section; and
   a display device that displays visible information with respect to the substitute color determined by the substitute color determiner,
   wherein the display device displays a color patch of the designated color and a color patch of the substitute color, arranged in a juxtaposed array as the visible information.

2. The color reproduction assisting system according to claim 1, wherein the substitute color determiner determines a color whose color difference from the designated color is minimum as the substitute color on condition that the number of the printing conditions under which the designated color can be reproduced remains the same.

3. The color reproduction assisting system according to claim 1, wherein the printing condition acquirer further acquires degrees of importance allotted to the printing conditions, respectively; and
   the substitute color determiner determines the substitute color so that the designated color can be reproduced under all printing conditions whose degrees of importance are higher than other printing conditions.

4. A color reproduction assisting method comprising:
   using one or more computers to perform:
   acquiring a plurality of printing conditions;
   acquiring designated color information with respect to a single designated color;
   judging whether the designated color specified from the designated color information can be reproduced under the printing conditions that are acquired or not;
   determining a substitute color that is different from the designated color in order to increase number of the printing conditions under which the designated color can be reproduced on condition that at least one of the printing conditions under which the designated color cannot be reproduced is judged as being present; and
   displaying visible information on a display device with respect to the substitute color that is determined,
   wherein the display device displays a color patch of the designated color and a color patch of the substitute color, arranged in a juxtaposed array as the visible information.

5. A non-transitory computer readable storage medium storing a program for enabling at least one computer to carry out the steps of:
   acquiring a plurality of printing conditions;
   acquiring designated color information with respect to a single designated color;
   judging whether the designated color specified from the designated color information can be reproduced under the printing conditions that are acquired or not;
   determining a substitute color that is different from the designated color in order to increase number of the printing conditions under which the designated color can be reproduced on condition that at least one of the printing conditions under which the designated color cannot be reproduced is judged as being present; and
   displaying visible information on a display device with respect to the substitute color that is determined,
   wherein the display device displays a color patch of the designated color and a color patch of the substitute color, arranged in a juxtaposed array as the visible information.

* * * * *